US011424956B2

(12) United States Patent
Wetterau et al.

(10) Patent No.: US 11,424,956 B2
(45) Date of Patent: Aug. 23, 2022

(54) TRANSMISSION SYSTEM FOR CONTROL DATA

(71) Applicant: ZF Friedrichshafen AG, Friedrichshafen (DE)

(72) Inventors: Michel Wetterau, Meersburg (DE); Ingo Lippenberger, Horgenzell (DE); Andreas Wildbrett, Bermatingen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 43 days.

(21) Appl. No.: 16/966,253

(22) PCT Filed: Jan. 10, 2019

(86) PCT No.: PCT/EP2019/050490
§ 371 (c)(1),
(2) Date: Jul. 30, 2020

(87) PCT Pub. No.: WO2019/149488
PCT Pub. Date: Aug. 8, 2019

(65) Prior Publication Data
US 2021/0044448 A1    Feb. 11, 2021

(30) Foreign Application Priority Data
Jan. 31, 2018   (DE) ..................... 10 2018 201 433.7

(51) Int. Cl.
*H04L 12/403*   (2006.01)
*H04L 67/12*    (2022.01)
(Continued)

(52) U.S. Cl.
CPC ............ *H04L 12/403* (2013.01); *H04L 12/40* (2013.01); *H04L 67/12* (2013.01); *H04L 69/22* (2013.01); *H04L 69/329* (2013.01)

(58) Field of Classification Search
CPC ....... H04L 12/403; H04L 12/40; H04L 67/12; H04L 69/22; H04L 69/329
See application file for complete search history.

(56) References Cited

U.S. PATENT DOCUMENTS

2016/0028640 A1* 1/2016 Zhang ..................... H04L 69/22
                                                                370/389
2016/0344653 A1* 11/2016 Kiribuchi .............. H04L 67/125
(Continued)

FOREIGN PATENT DOCUMENTS

DE   102006014453 A1   10/2007
DE   102007043769 A1    3/2009
(Continued)

OTHER PUBLICATIONS

International Search Report (English Translation) PCT/EP2019/050490, dated Mar. 15, 2019. (3 pages).
(Continued)

*Primary Examiner* — Henry Tsai
*Assistant Examiner* — John B Roche
(74) *Attorney, Agent, or Firm* — Dority & Manning, P.A.

(57) ABSTRACT

A control bus (165) permits the transmission of a message (205) of a predetermined message length. A method (300) for transmitting pieces of information on the control bus (165) includes transmitting a message (205). The message includes a first field (210) and a second field (215). The first field (210) contains a variable reference to a type of information, and the second field (215) contains a piece of information of the type of information referred to in the first field (210).

15 Claims, 3 Drawing Sheets

(51) Int. Cl.
*H04L 69/22* (2022.01)
*H04L 69/329* (2022.01)
*H04L 12/40* (2006.01)

(56) References Cited

U.S. PATENT DOCUMENTS

2017/0373813 A1\* 12/2017 Asterjadhi ............ H04W 28/06
2019/0208470 A1\* 7/2019 Asterjadhi .......... H04W 52/028

FOREIGN PATENT DOCUMENTS

| EP | 2725436 A1 | 4/2014 |
| EP | 3089401 A1 | 11/2016 |
| WO | WO 2009/036891 | 3/2009 |

OTHER PUBLICATIONS

German Search Report DE102018201433.7, dated Sep. 17, 2018. (12 pages).

\* cited by examiner

TRANSMISSION SYSTEM FOR CONTROL DATA

CROSS-REFERENCE TO RELATED APPLICATIONS

The present application is related and has right of priority to German Patent Application No. 10 2018 201 433.7 filed on Jan. 31, 2018 and to PCT Application Publication No. 2019/149488 filed on Jan. 10, 2019, both of which are incorporated by reference in their entirety for all purposes.

FIELD OF THE INVENTION

The present invention relates generally to a transmission system for control data. In particular, the invention relates generally to the flexible transmission of information between different control devices with the aid of a control bus.

BACKGROUND

On board a motor vehicle, multiple control units are communicatively networked with the aid of a control bus. The control bus can permit the transmission on the initiative of any type of control unit, or a master can be provided, which, as the only one, can arbitrate the bus and prompt a slave to transmit a message of a predetermined message type. Usually, messages to be exchanged on the communication bus are limited in terms of length and are subdivided into predetermined fields. One field usually includes an address of a sender or recipient. One further field can contain an identification of the message type. Both fields are limited in terms of length, so that the number of bus users and/or the number of different message types can also be limited.

In practical applications, a control task can be difficult to implement within these limitations. For example, more different types of messages may be necessary than can be defined with the aid of the protocol of the control bus. In this case, the utilization of a more complex control bus is frequently necessary, which supports a greater bandwidth, a greater number of message types, or greater volumes of user data. This also means, however, in general, changed physical driver modules, possibly also other voltage levels, another transmission medium, or another data-transmission approach. An existing control unit can usually not be retrofitted with a reasonable amount of effort. In addition, a certification of the driver modules can be necessary in the case of a safety-critical application, such as the open-loop control of an aspect of a motor vehicle, and so a considerable effort may possibly need to be made to exchange the control bus.

SUMMARY OF THE INVENTION

Example aspects of the present invention therefore provides an improved technique, in order to be able to also perform a control task that is complex or versatile with respect to data transmission with the aid of a simple control bus.

A control bus permits the transmission of a message of a predetermined message length. A method for transmitting pieces of information on the control bus includes transmitting a message, which includes a first field and a second field. The first field contains a variable reference to a type of information, and the second field contains a piece of information of the type of information referred to by the first field.

As a result, different types of information can be transmitted within one message, so that an increased number of different pieces of information can be effectively addressed. Such a limitation of the control bus can be overcome in this way.

Multiple messages can be transmitted one after the other, wherein the reference of the first field is changed in consecutive messages. This variant can be advantageous, in particular, for the case in which the pieces of information of the second field are to be transmitted at a low frequency.

The reference of the first field can be changed in a cyclical manner. The pieces of information transmitted within the second field can then have a predetermined repetition rate, which can be lower than the repetition rate of the messages by the cycle length.

The message can include a third field, which contains pieces of information of a fixedly predetermined type of information. Pieces of information that are to be transmitted frequently can be transmitted in the third field. For example, control parameters of a control device can be transmitted in the third field in every message, while peripheral conditions that change only slowly, such as a temperature of a controlled object, can be transmitted in the second field. In particular when the first field is varied in a cyclical manner, two different, fixed data rates can be implemented in this way.

The control bus can include a master and at least one slave. The master can request, with the aid of a first message to the slave, a transmission of a second message of a second message type from the slave. A bus controlled, by an open-loop system, by the master can be more robust, and an arbitration phase can be omitted or run in a simpler manner. The transmission of a message can be better planned, in particular with respect to time. In one particularly preferred embodiment, the first field can be cyclically changed by the slave in consecutive messages. The method can permit a simpler processing, in particular by the master.

The first message can contain a reference to a predetermined message type of the cycle. In other words, the master can set an index of the cycle in the event of any type of request for a second message. Basically, this possibility can be utilized in order to directly request a certain piece of information within the cycle. The slave-side incrementation of the first field can be stopped, in that the index is set by the master upon each request.

The message can also include a fourth field, which refers to one of several different message types, wherein a predetermined cycle length is associated with each message type. In this way, the control bus can be operated in different transmission modes. One transmission mode can correspond to one operating condition of a terminal (master or slave). For example, a first message type can be transmitted in the case of a system start, wherein this message type can include a predetermined number of different messages. Each of these messages can be transmitted one time. Therefore, the system start can be concluded and messages of a second message type can be transmitted in a normal operating mode. Once again, cyclically different messages of the second message type can be transmitted one after the other.

Types of information of the fields of a message can be defined with reference to a message type. In other words, the length of a field of a message can be constant in one message type, but can be different between different message types.

A device for transmitting pieces of information on a control bus, which permits the transmission of a message of a predetermined message length, includes an interface for the connection to the control bus and a control device. The control device is configured for transmitting a message, which includes a first field and a second field. The first field contains a variable reference to a type of information, and the second field contains a piece of information of the type of information referred to by the first field.

The device is preferably configured for partially or completely carrying out or controlling a method described herein. The method can be present as a computer program product and can run on a processing unit of the device. Advantages and features of the method can be transferred to the device, and vice versa.

BRIEF DESCRIPTION OF THE DRAWINGS

Example aspects of the invention will now be described more precisely with reference to the attached figures, in which.

DETAILED DESCRIPTION

Figure 1:
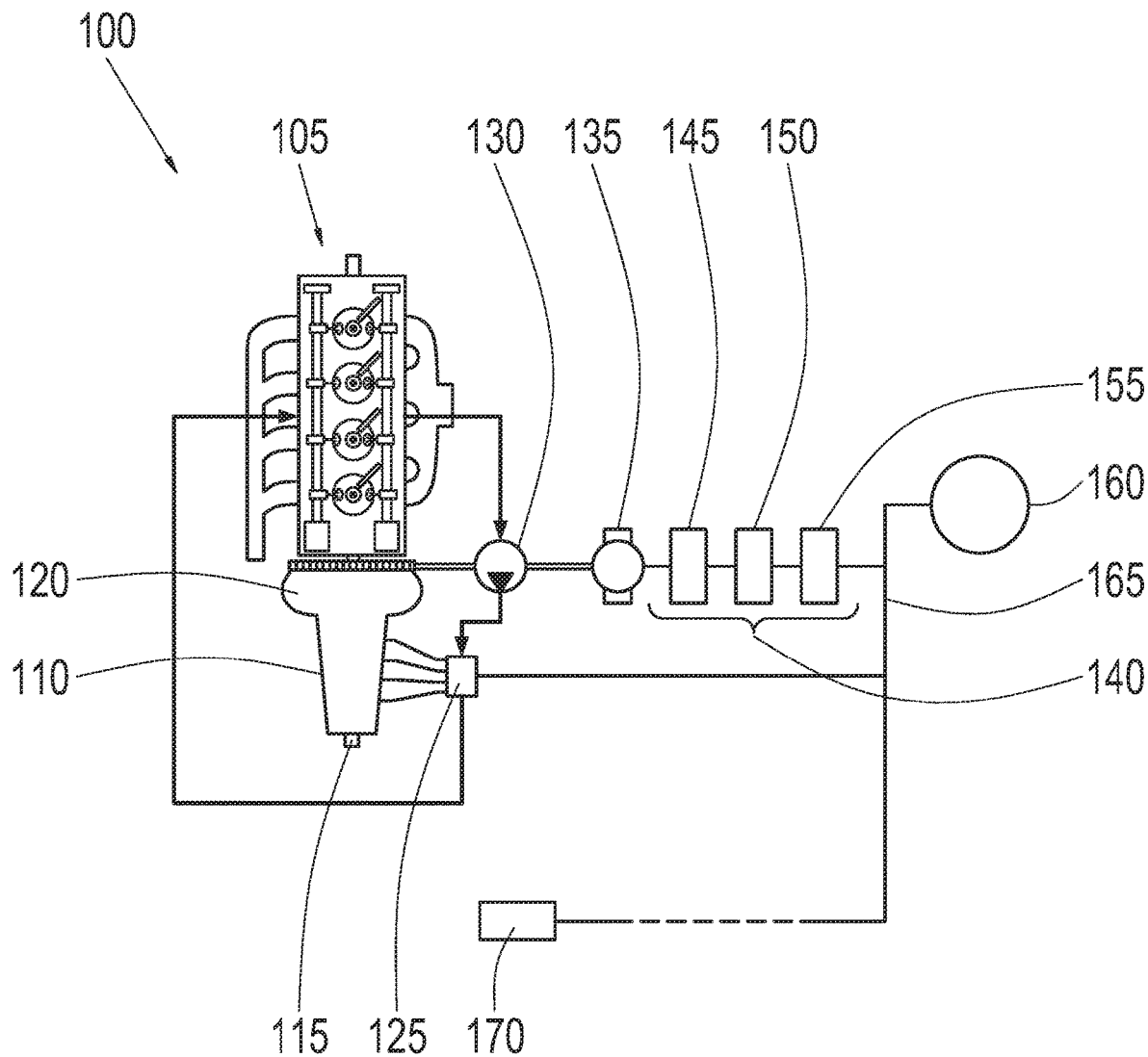
FIG. 1 shows an exemplary transmission system.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a transmission system 100. A prime mover 105, represented here as an internal combustion engine by way of example, acts via a transmission 110 upon a drive shaft 115. The transmission system 100 is preferably configured for driving a motor vehicle, in particular a passenger car, and can include a driving wheel, upon which the drive shaft 115 can act.

The transmission 110 can be controlled by an open-loop system, in that, in particular, an engaged gear step is changed. If the transmission 110 includes a converter clutch 120, parameters on the converter clutch 120, such as a blade position or an activation of a torque converter lockup clutch, are controllable by an open-loop system. Preferably, a first control device 125 is provided for the open-loop control of the transmission 110. Certain operations within the transmission 110 can be hydraulically controlled, for example, the disengagement or engagement of a clutch or a brake. For this purpose, a predetermined fluid pressure of a hydraulic fluid is necessary, which can be made available by a pump 130. Oil, in particular, can be utilized as fluid. The oil can be withdrawn, for example, from a forced oil lubrication of the prime mover 105. Oil flowing out of the control device can then be returned into an oil sump or at another point of the prime mover 105.

The pump 130 can be mechanically driven with the aid of the prime mover 105, wherein a fluid pressure can be dependent on the rotational speed of the prime mover 105. The pump 130 can be driven with the aid of an electric motor 135. The electric motor 135 can operate as a power-split auxiliary drive of the pump 130 in addition to the prime mover 105, or the pump 130 can permit only one single drive, so that the electric motor 135 can act upon the pump 130 as an alternative to the prime mover 105.

The electric motor 135 can be controlled by an open-loop system with the aid of a control device 140, which, in the represented example embodiment, includes a bridge circuit 145 and a determination unit 150 for determining voltages or currents to be set. The bridge circuit 145 can be differently designed depending on the type of the electric motor 135. In one preferred type of construction, the electric motor 135 is designed as a brushless DC motor (BLDC) including, more preferably, three phases. The bridge circuit 145 can make three mutually independent voltages available to the phases. For this purpose, each phase is connected between the potentials of an intermediate circuit voltage with the aid of two current valves. The current valves are opened and closed in alternation, so that a predetermined voltage sets in at the inductive load of the phase.

The determination unit 150 operates preferably with the aid of field-oriented control (FOC) or field-oriented regulation (FOR), in which, preferably, the rotational speed and/or the torque of the electric motor 135 can be specified. The determination unit 150 can be connected to a further control device 160 with the aid of an interface 155. The control device 160 can be configured for the open-loop control of any aspect or even multiple aspects of the transmission system 100. For the communication between the control device 140 of the electric motor and the control device 160 of the transmission system 100, preferably a control bus 165 is provided, to which the control device 125 of the transmission 110 can also be connected. Optionally, one more control device or multiple further control devices can be connected to the control bus 165, for example, a control device 170 for the open-loop control of the prime mover 105. Optionally, the control device 160 is also connected to one further control bus, for example, a CAN bus, wherein the control device 160 can transmit data between the two busses (in the function of a "bridge").

The control bus 165 is preferably designed as a field bus including a master and one slave or multiple slaves. In one example embodiment, the control bus is designed as a LIN bus (LIN: Local Interconnect Network), wherein the control device 160 is preferably configured as a master. Other control busses are also possible, however, for example, a CAN bus (CAN: Controller Area Network). Preferably, this is a serial bus, which can make do with one wire, in the case of the LIN bus, and with two wires, in the case of the CAN bus, as the physical transmission medium.

The amount of information to be exchanged between the control device 160 and the control device 140 of the electric motor 135 can be great. In particular, there can be a need to transport a wide variety of different data in different operating conditions of the transmission system 100 over the control bus 165. For this purpose, the master can be configured for addressing a slave via the control bus 165 and requesting that the slave return a predetermined message. The slave usually responds immediately with the requested message, which can include multiple predetermined fields. Usually, only a limited number of messages can be defined, due to a limitation of the length of a corresponding field. The greater is the number of different pieces of information to be transmitted, the greater is the number of messages that must be defined, however. If disjoint messages are utilized, transmissions of pieces of information needed less frequently can also imperil the frequency of the transmission of more critical pieces of information.

In the following description, it is assumed, by way of example, that there is one master 160 and one slave 155, although other constellations, in particular including multiple slaves or including multiple masters, are also possible.

Figure 2:
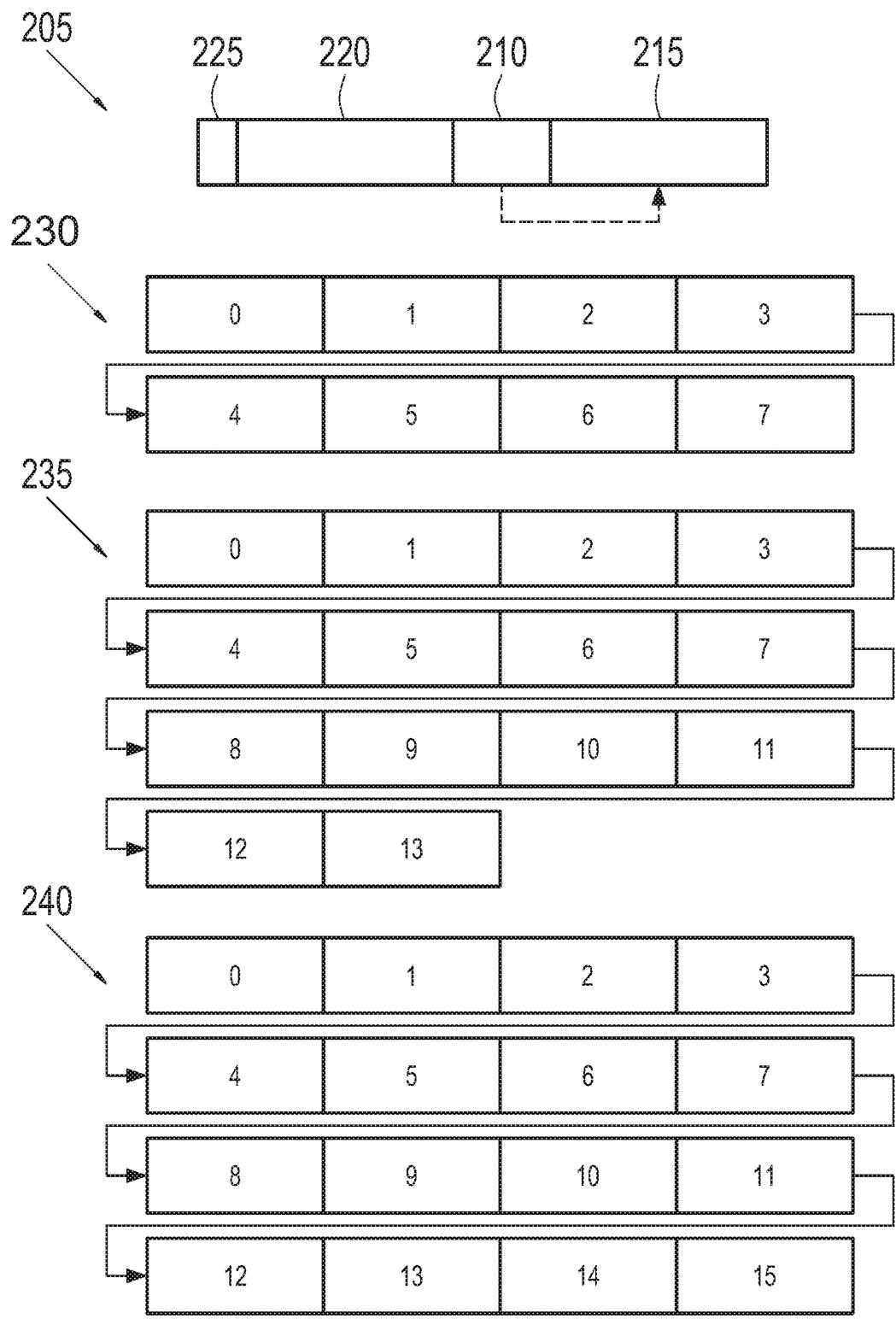
FIG. 2 shows a schematic of exemplary messages for transmission on a control bus.

FIG. 2 shows, in an upper area, a message 205, which can be transmitted on a control bus 165, and, in a lower area, three different exemplary sequences of messages 205 on the control bus 165. The message 205 includes a first field 210 and a second field 215, in order to enable a multiplexing of pieces of information. The second field 215 can contain different pieces of information. Reference is made to the type of information thereof, in each case, with the aid of a predetermined reference in the first field 210. The reference in the first field 210 can be indicated, in particular, as an index, for example, in the form of a numeral, preferably in binary form. For example, different types of information can be established for the first field 210, for which 12 different indices can be represented, as binary-coded decimals, in the first field 210 of the length 4 bits (or longer). In a simple example, the first field 210 can have, for example, the index 1 if the second field 215 contains a measured temperature, or the index 2 if the second field 215 contains an error code.

An optional third field 220 can include further bits of information, the information type of which is constant at least within one message type 230 through 240. The third field 220 can also be internally subdivided, so that various pieces of information, of invariable types of information in each case, can be transmitted. In the third field 220, for example, a control parameter, such as an internally determined specified rotational speed or an actual rotational speed of the electric motor 135, can be transmitted.

An optional fourth field 225 can indicate the message type of the message 205. The length of the fourth field 225 is preferably constant over all message types and is always located at the same point with respect to the beginning of the message 205. If the messages 205 of different message types have different lengths, it is more preferable that the fourth field 225 be situated ahead of a variable field of the message 205. In particular, the fourth field 225 can be situated at the beginning of the message 205.

Different lengths of fields of the message 205 can be associated with different message types. The messages 205 of different message types preferably have the same length, although the messages 205 of different message types can also have different lengths. In particular, a predetermined supply of information types of the second field 215 can be associated with one message type. Preferably, an index is associated with each type of information, so that a predetermined sequence of types of information results from indices arranged in a strictly monotonous order (increasing or decreasing). The sequence can be, in particular, cyclically executed.

It is preferred that a predetermined part of a message 205 (preferably the last byte within a message 205) carries a checksum (CRC) over the remaining transmitted pieces of information. This applies, preferably, for all messages 205 that are transmitted in any direction between the master 160 and the slave 155. The checksum can be considered to be a separate static field or part of the fourth field 225.

A transmission of messages 205 on the control bus 165 preferably takes place in such a way that a predetermined message 205 is sent by the master 160 to a predetermined slave 155. The message 205 contains a request to provide a predetermined message 205, and the slave 155 responds with a message 205 containing the sought information. Each message 205 of the slave 155 to the master 160 therefore needs an explicit preceding message 205 by the master 160.

In the present case, it is assumed that the control bus 165 is a LIN bus, in which the master 160 provides, for a response of a slave 155, the start ("header") of a message frame on the control bus 265 and, thereafter, the slave 155 transmits the requested data. The request of the master 160 preferably has the same length as a response message 205 of the slave 155, eight bytes in the present case, preferably in addition to the header; this corresponds to the maximum of the LIN specification. In the represented example embodiment, the message 205 includes a CRC8 checksum in the last byte.

A request message 205 from the master 160 to the slave 155 can have a separate message type and can make do without the first two fields 210 and 215. Pieces of information of the static third field 220 can include, for example, a specified rotational speed of the electric motor 135, an oil temperature of the prime mover 105, or an estimated torque of the electric motor 135. Further bits can include the index of a type of information of a message 205 to be returned. A predetermined number of bits can be provided for additional functions. Moreover, bits can be reserved at different points of the message 205 for a subsequent use. Individual bits can also be utilized for special functions, for example, one bit for resetting a fault condition or one bit for displaying whether the electric motor 135 is to run in the clockwise direction or in the counterclockwise direction. In addition, an access counter (AC) can be provided, which contains values cyclically incremented over the individual messages 205. In this way, on the basis of the access counter, a first message 205 from the master 160 to the slave 155 can be associated with a second message 205 from the slave 155 to the master 160. In this way, a message 205 that became lost during the transmission or was transmitted multiple times can be noticed.

In the lower area of FIG. 2, three different message types 230, 235 and 240 are represented, by way of example, including appropriate sequences of information types in the respective second fields 215. Exemplary indices of the individual types of information of the represented message types 230 through 240 are represented in FIG. 2. The representation from FIG. 2 is based on a standard message type 230, an identification message type 235, and a development message type 240.

In the standard message type 230, the following exemplary types of information can be provided:

| Index | Type of information |
|---|---|
| 0 | phase current phase U |
| 1 | intermediate circuit voltage at the point in time of the phase current U |
| 2 | temperature of the control device 140 |
| 3 | additional functions |
| 4 | phase current phase V |
| 5 | intermediate circuit voltage at the point in time of the phase current V |
| 6 | error indicators (1) |
| 7 | error indicators (2) |

The standard message type 230 is usually transmitted at fixed time intervals, provided the control device, the electric motor 135, or the transmission system 100 is operating. Pieces of information of the displayed types of information can be cyclically transmitted from the slave 155 to the master 160.

At a selected transmission rate, a message 205 can be transmitted within approximately 10 ms, so that, in the aforementioned example, there can be approximately 40 ms between the transmission of the phase current of the phase U and the transmission of the phase current of the phase V due to the particular necessary request messages 205 by the master 160. In order to avoid a decorrelation of the intermediate circuit voltage from the phase currents, pairs of phase currents and intermediate circuit voltages corresponding thereto with respect to time are transmitted in this case.

In the identification message type 235, the following types of information, for example, can be provided.

| Index | Type of information |
|---|---|
| 0 | identification (1) |
| 1 | identification (2) |
| 2 | identification (3) |
| 3 | identification (4) |
| 4 | identification (5) |
| 5 | software version (1) |
| 6 | software version (2) |
| 7 | hardware version |
| 8 | checksum (CVN) over data memory of the software (1) |
| 9 | checksum (CVN) over data memory of the software (2) |
| 10 | response identifier for OBD (1) |
| 11 | response identifier for OBD (2) |

The identification message type 235 can be utilized, for example, when the control device 140 is initialized, for example, during the start of a motor vehicle with the aid of the transmission system 100. Identifiers of various components of the transmission system 100 or of a surrounding motor vehicle can be exchanged, in order to subsequently be able to ensure an operation as specified. Typically, the identification message type 235 is transmitted on the control bus 165 only one time per start of the prime mover 105.

In the development message type 240, the following types of information, for example, can be provided.

| Index | Type of information |
|---|---|
| 0 | phase current phase V |
| 1 | temperature of the control device 140 |
| 2 | phase current phase U |
| 3 | intermediate circuit voltage at the point in time of the phase current U |
| 4 | phase current phase V |
| 5 | rotor position |
| 6 | phase current phase U |
| 7 | ignition angle |
| 8 | phase current phase V |
| 9 | temperature of the control device 140 |
| 10 | phase current phase U |
| 11 | intermediate circuit voltage at the point in time of the phase current V |
| 12 | phase current phase V |
| 13 | generator voltage of the electric motor 135 or zero crossing, if necessary, for analyzing the rotor position sensor |
| 14 | phase current phase U |
| 15 | PWM duty cycle |

The development message type 240 can transmit certain pieces of information more frequently or less frequently than the standard message type 230; additional values can also be transmitted. The development message type 240 can be advantageously utilized within the scope of a development of components of the transmission system 100, in particular the pump 130, the electric motor 135, the control device 140, or the control device 160, or even for a more precise diagnosis, for example, in a workshop, for example, for troubleshooting.

Additional message types can be provided, for example, for transmitting fault conditions or for shutting off the electric motor 135 or the control device 140. In one example embodiment, a shut-off of all slaves 155 takes place if no message of the master 160 takes place on the control bus 165 past a predetermined time, for example, approximately four (4) seconds.

The third field 220 of messages 205 of the message types 230 through 240 can always be occupied in the same manner and, for example, include a specified rotational speed of the electric motor 135, the above-described access counter, or an index of the type of information transmitted in the second field 215. Moreover, a certain direction of rotation of the electric motor 135, an error indicator, an indicator of a completed initialization of the control device 140, and indicator of a communication error, a transient fault, a permanent fault, or an indicator of a warning about endangered data security. Remaining bits can be reserved for a subsequent use.

Figure 3:
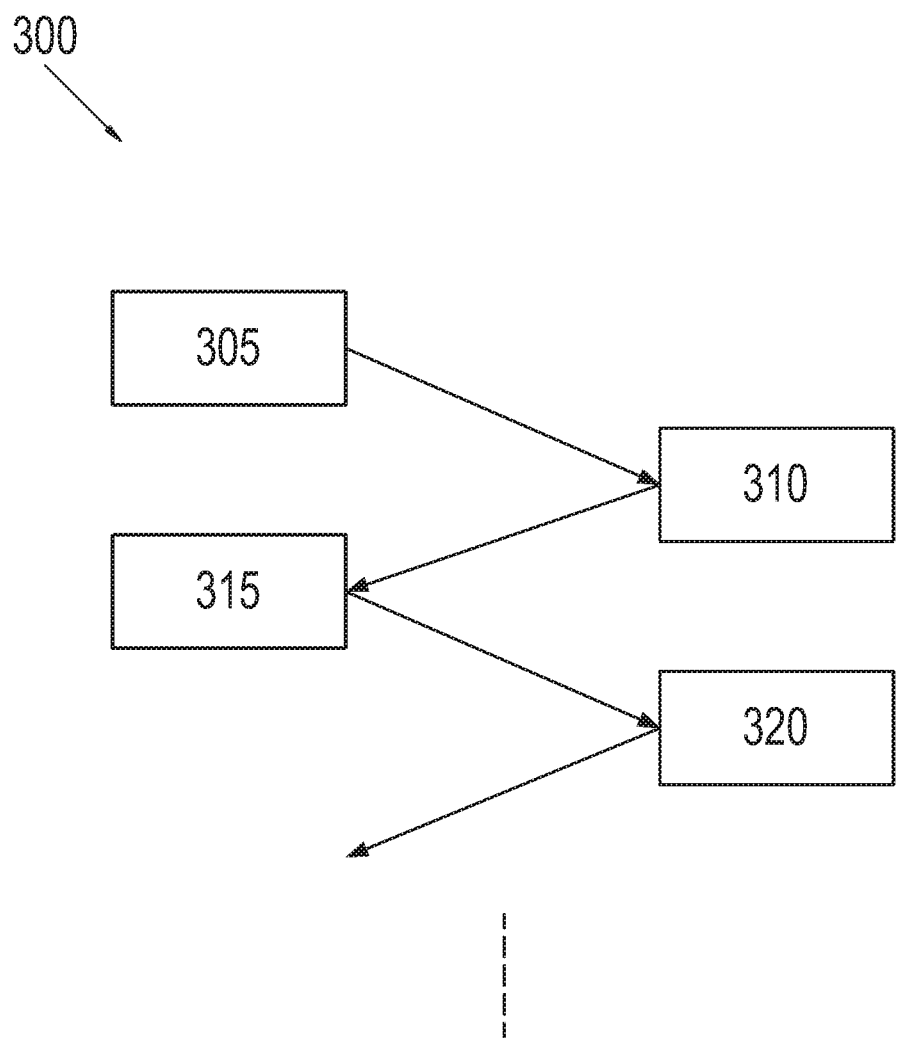
FIG. 3 shows a flow chart of a method for transmitting messages on a control bus.

FIG. 3 shows a flow chart of an exemplary method 300 for transmitting messages 205 on a control bus 165. The method 300 is preferably carried out in interaction between the master 160 and the slave 155. In the representation from FIG. 3, the master is arranged on the left, conceptually, and the slave 155 is arranged on the right, conceptually, and the represented steps each relate to a transmission of a message 205 from one party to the other party, as indicated by the arrows.

In a first step 305, the master 160 transmits a first message 205 to the slave 155, which contains a request to transmit a second message 205 back. A predetermined message type 230 through 240, to which the response is to correspond, can also be indicated. Optionally, the first message 205 can contain an index, to which the value of the first field 210 of the requested second message 205 is to be set. If such a specification is not made, the slave 155, in its response, can assume a fixed index or determine an appropriate index on its own.

In one step 310, the slave 155 responds to the master 160 with the requested second message 205. The fourth field 225 of the message type is preferably set to the value of the fourth field 225 of the received first message 205, in order to display the utilized message type. The first field 210 contains an index, which indicates the type of information associated with the pieces of information in the second field 215.

In one step 315, the master 160 transmits a third message 205 to the slave 155 with the request to transmit a fourth message 205. In this case, once again, a predetermined index can be indicated for the first field 210 of the response, or the slave 155 can determine the index itself, in particular in that the slave 155 increments a corresponding counter. If its value exceeds the number of defined types of information of the message type 230 through 240, the slave 155 can reset the index appropriately, so that, via the transmitted messages 205, a cyclic transmission of pieces of information of all agreed-upon types of information can take place. Exemplary sequences of response messages 205 in the case of sequential indexing are described in greater detail above with reference to FIG. 2. An appropriate message 205 is transmitted from the slave 155 to the master 160 in 320.

Such a sequence can be repeated at any frequency, in order to continuously transmit pieces of information between the master 160 and the slave 155 in both directions. The pieces of information of the fourth field 225 can be transmitted at a predetermined high frequency. The frequency of the information transmitted from the master 160 to the slave 155 is the same in this case. In the case of a sequential order of the indices of the first field 210, the defined fields are transmitted from the slave 155 to the master 160 at a correspondingly lower frequency. The master 160 can change the sequence of the transmitted types of information at any time, however, and, in this way, request pieces of information of certain types of information more frequently or earlier.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS

100 transmission system
105 prime mover
110 transmission
115 drive shaft
120 converter clutch
125 control device transmission
130 pump
135 electric motor
140 control device electric motor
145 bridge circuit
150 determination unit
155 interface (slave)
160 control device transmission system (master)
165 control bus
170 control device
205 message
210 first field
215 second field
220 third field
225 fourth field
230 first message type (standard)
235 second message type (identification)
240 third message type (development)
300 method
305 request message (index n)
310 return message (index n)
315 request message (index n+1)
320 return message (index n+1)

The invention claimed is:

1. A method for transmitting pieces of information on a control bus, the control bus permitting transmission of a message of a predetermined message length, the method comprising:
   transmitting, on the control bus, a message comprising a first field, a second field, a third field, and a fourth field,
   wherein the first field contains a variable reference to a type of information,
   wherein the second field contains a piece of information of the type of information referred to in the first field, and
   wherein the fourth field refers to one of a plurality of different message types, a length of the fourth field is constant for the plurality of different message types, and a location of the fourth field with respect to a beginning of the message is constant for the plurality of different message types.

2. The method of claim 1, wherein transmitting the message comprises transmitting a plurality of messages one after the other, and the reference of the first field changes in consecutive messages.

3. The method of claim 2, wherein the reference of the first field cyclically changes.

4. The method of claim 2, wherein a predetermined cycle length is associated with each message type.

5. The method of claim 4, wherein types of information of the fields of the message are defined with respect to each message type.

6. The method of claim 1, wherein the third field includes information of a fixedly predetermined type of information.

7. The method of claim 6, wherein a predetermined cycle length is associated with each message type.

8. The method of claim 7, wherein types of information of the fields of the message are defined with respect to each message type.

9. The method of claim 1, wherein the control bus comprises a master and at least one slave, and the master configured for requesting, via a first message to the slave, a transmission of a second message of a second message type from the slave.

10. The method of claim 9, wherein the variable reference of the first message comprises a reference to a predetermined message type of the cycle.

11. The method of claim 9, wherein a predetermined cycle length is associated with each message type.

12. The method of claim 11, wherein types of information of the fields of the message are defined with respect to each message type.

13. The method of claim 1, wherein:
   the control bus is disposed on a vehicle;
   the control bus configured for transmission of the message between a plurality of control devices of the vehicle;
   transmitting the message comprises transmitting the message from a first control device of the plurality of control devices to a second control device of the plurality of control devices.

14. The method of claim 13, wherein the plurality of control devices comprises a control device of an electric motor of the vehicle and a control device of a transmission system of the vehicle.

15. A device for transmitting pieces of information on a control bus, the control bus permitting transmission of a message of a predetermined message length, the device comprising:
   an interface for connection to the control bus; and
   a control device configured for transmitting a message, the message comprising a first field, a second field, a third field, and a fourth field,
   wherein the first field contains a variable reference to a type of information,
   wherein the second field contains a piece of information of the type of information referred to in the first field, and
   wherein the fourth field refers to one of a plurality of different message types, a length of the fourth field is constant for the plurality of different message types, and a location of the fourth field with respect to a beginning of the message is constant for the plurality of different message types.

* * * * *